United States Patent Office 3,149,963
Patented Sept. 22, 1964

3,149,963
PROCESS RELATING TO ORE BENEFICIATION
Arthur Wallace Evans, Middlesbrough, and John Robert Moody, Stockton-on-Tees, England, assignors to British Titan Products Company Limited, Durham, England, a corporation of the United Kingdom
No Drawing. Filed Apr. 10, 1962, Ser. No. 186,323
Claims priority, application Great Britain, Apr. 14, 1961, 13,594/61
16 Claims. (Cl. 75—101)

The present invention relates to a process for treating an iron-containing titaniferous material whereby it may be more readily beneficiated to have a reduced iron content.

Iron-containing titaniferous materials, for example, ilmenite, are used in the production of titanium dioxide, particularly in the production of pigmentary titanium dioxide. For example, such materials may be treated by the so-called "sulphate process" or by fluidised bed halogenation followed by fluidised bed oxidation. Before such treatment, it is desirable that as much iron as possible be removed from the material.

Thus, especially for halogenation of the titaniferous material, it is desirable that the material contain by weight less than about 30%, and preferably less than 15% or even 10%, of iron.

Various methods have been suggested for increasing the proportion of titanium dioxide in such materials, as a preliminary step, by removal of at least some of the iron. In general, however, these methods are difficult to carry out, are uneconomical and tend to give rise to products which are difficult to remove from the equipment and/or to dispose of.

It is an object of the present invention to provide a process for the treatment of an iron-containing titaniferous material so that it is particularly suitable for further treatment to give a beneficiated titaniferous product having a reduced iron content.

Accordingly, the present invention is a process for treating an iron-containing titaniferous material comprising sulphiding such material in a dispersed state at an elevated temperature in the presence of oxygen. The oxygen may be used alone or in a mixture containing it, e.g., air.

A purpose of the use of a dispersed state is to avoid or reduce agglomeration or sintering of the titaniferous material, and this can best be achieved by fluidising such material while it is being sulphided. The invention will be more particularly described in terms of fluidisation.

This sulphiding treatment converts iron impurities into iron sulphide (believed to have the formula FeS) which is more readily removed than the original impurities. The iron sulphide can be removed after the sulphiding treatment.

The preferred method of removing the iron sulphide is by leaching with a dilute mineral acid, for example sulphuric acid. Such acid may conveniently be derived from the hydrolysis of titanium sulphate to titanium dioxide, in the aforementioned "sulphate process" for the preparation of pigmentary titanium dioxide. By this means a beneficiated product is obtained which has a lower iron content than the original iron-containing titaniferous material.

The iron-containing titaniferous material is preferably ilmenite though leucoxene or slag is also very suitable. The material may be initially in the massive form, in which case it will require grinding, but is preferably in the weathered form, in which the proportion of iron has already been somewhat reduced (by natural means) relative to that found in the massive form. The weathered forms of ilmenite and leucoxene are found as beach deposits in many parts of the world. The weathered form is commonly already of such a particle size (for example a sand) that it requires no further grinding before being suitable for treatment in the process of the present invention. It is preferred, whatever the form of starting material, to subject it to a process of preliminary mechanical beneficiation (including magnetic and/or electrostatic methods) to remove impurities not containing titanium.

The particle size of the material to be used in the fluidised bed is preferably in the range of about 50–1,000 microns, and particularly in the range of about 75–300 microns. The bed can be formed of the titaniferous material alone, although in some cases sintering may be observed; sintering is especially likely when the material has a high iron content. It is preferable, however, to mix the titaniferous material with a finely-divided diluent, which may be of similar particle size, to prevent sintering or agglomeration of the bed during the process; this is particularly the case with ilmenite, whereas the use of leucoxene does not usually require such diluent. The diluent may be an inert finely-divided material, for example, a silica sand, if desired, or it may consist of recycled beneficiated material which has been leached with acid as described above.

It is preferred to recycle the beneficiated product after treatment with dilute mineral acid as described above. Such recycled product serves as diluent for fresh iron-containing titaniferous material. Moreover, the recycled product may still contain some iron, and its further beneficiation will diminish or remove this remaining iron.

The sulphiding of the iron-containing titaniferous material is effected by means of sulphur in a sulphur-containing material, as more particularly described later in this specification. Part of the sulphur-containing material reacts with the iron oxides in the titaniferous material while another part is burned in the oxygen.

The fluidised bed of the titaniferous material is maintained at an elevated temperature to ensure that iron in this material reacts with sulphur to form mainly ferrous sulphide. A temperature of at least 600° C. is generally desirable, for example a temperature in the range of 600° C. to 900° C. It is preferred that the temperature be in the range of 700° C. to 800° C.

The heat provided by the burning of part of the sulphur in the oxygen may be sufficient to maintain the temperature of the bed in the desired range. This is an important feature of the present invention, since it avoids the difficulty and inconvenience of heating the bed externally; in particular, the bed is evenly and uniformly heated by the burning vaporised sulphur, whereas with external heating only it would be very difficult to effect uniform heating of the bed if the process were carried out on a large scale. Moreover, producing the heat in the bed allows one to use a thermally insulated reactor to avoid waste of heat; it would be impractical to have such insulated wall if heat were to be supplied to the reactor through the wall. (If desired, however, additional heat may also be supplied to the bed, for example by preheating one or more of the gases introduced into the bed.)

The ratio of oxygen to sulphur should be such that excess sulphur is present in the bed to carry out the sulphiding reaction at a reasonable rate. This may be effected by introducing the oxygen into the bed in admixture with an inert gas. An example of such mixture of oxygen and inert gas is air. Another suitable mixture is "air" containing a proportion of oxygen less than that of normal air; such "air" is available as an effluent gas from furnaces such as those in which titanium dioxide pigment has been calcined. Since such "air" is at a higher temperature, for example up to about 400° C., less heat will be required from other sources such as burning sulphur.

The oxygen gas, or mixture of oxygen gas and inert gas, may suitably be used to fluidise the bed.

The sulphur-containing material introduced into the bed is preferably elemental sulphur. Other sulphur-containing materials which may be used include hydrogen sulphide and iron pyrites. The sulphur-containing material is suitably introduced into the lower part of the bed, for example through one or more injectors above the distributor through which the fluidising gas is passed into the bed. Conveniently, sulphur may be preheated to vaporise it before introduction into the bed since it is more easily handled in the vapour form. One method of achieving this is to introduce the sulphur through a tube or tubes in the bed whereby the heat of the bed is utilised to vaporise the sulphur.

The sulphided material is preferably continuously recovered, for example by operating the process with continuous additions of the reactants, and diluents if required, to the bed and continuous removal of a proportion of the bed materials to maintain the height of the bed at the desired level.

The sulphided product recovered from the bed may be ground to provide a greater surface area for acid attack, if the abovementioned further step of leaching with dilute mineral acid is used. On the other hand, if such sulphided product is to be chlorinated in a fluidised bed or recycled as a bed diluent, it may be necessary to repelletise the ground material to obtain a suitable particle size for this purpose.

In the abovementioned preferred further step of leaching the sulphided product with a dilute mineral acid in order to produce a final product containing a reduced proportion of iron, the acid should be normally of a strength equivalent to less than 75% sulphuric acid. A convenient acid strength is below about 30% sulphuric acid since this is the maximum strength of acid available as waste acid in the sulphate process. The preferred strength is in the range of 15% to 25%. The acid treatment converts the iron sulphide in the sulphided product to hydrogen sulphide and a solution of a ferrous salt. The titanium dioxide in the sulphided product remains unattacked by the acid and may be recovered by known methods such as filtration or centrifuging.

As mentioned above the mineral acid used in the leaching step may suitably be waste sulphuric acid, derived from the hydrolysis of titanium sulphate to titanium dioxide in the "sulphate process" for the preparation of pigmentary titanium dioxide. In such a case, the waste acid will normally contain some titanium in solution. It is preferred to carry out the leaching of the sulphided material with such waste acid at elevated temperatures, for example between 60° and 85° C., since under these conditions there is less danger of crystallisation of ferrous sulphate heptahydrate and at least some of the dissolved titanium in the acid tends to be precipitated as the acid is neutralised and may thus be recovered. Under certain conditions it may, however, be necessary to dilute the mixture to prevent the crystallisation of ferrous sulphate during this process.

The hydrogen sulphide produced in the leaching of the sulphided product with acid may be conveniently converted to sulphuric acid by known methods. Alternatively, it may be converted to sulphur which is more easily stored and which may later be converted to sulphuric acid or used again in the present process. Any sulphur dioxide emerging from the bed in the sulphiding step may also be recovered and converted to sulphuric acid by known methods.

The effluent gas from the sulphiding step will normally contain sulphur dioxide produced by the reaction of part of the sulphur with oxygen, as described above. This sulphur dioxide may be collected and converted to sulphuric acid or to sulphur; the latter may later be converted to sulphuric acid if desired.

The effluent gas also usually contains some unreacted sulphur, and this may be condensed and, if desired, converted to sulphuric acid.

Summarising, it may be possible in the present process to recover sulphur (or sulphuric acid) from three sources:

(i) From the sulphur dioxide in the effluent gas derived from the burning of the sulphur
(ii) From the hydrogen sulphide produced during the leaching of the sulphided material, and,
(iii) From the unchanged sulphur in the effluent gases, i.e., sulphur which has neither been burned nor utilised in the sulphiding of the iron. This can be condensed from the effluent gases.

The recovered sulphur may, if desired, be used to sulphide fresh titaniferous material.

The ferrous salt solution produced in the leaching of the sulphided product with acid normally contains a high concentration of ferrous salt. This is especially true when waste sulphuric acid from the abovementioned hydrolysis of titanium sulphate is used, since this acid already contains ferrous sulphate from the ilmenite digestion which is a step of the abovementioned "sulphate process" for producing pigmentary titanium dioxide. In such a case it may, therefore, be possible to obtain a considerable amount of ferrous sulphate (as copperas) from the solution merely by cooling. Alternatively, the solution may be concentrated at above 64° C. to form a slurry of ferrous sulphate monohydrate.

In either case the ferrous sulphate can be decomposed by heat to give sulphur dioxide which can be converted into sulphuric acid. If the dilute acid has not been completely neutralised by the sulphided material, the mother liquor from the crystallisation of ferrous sulphate, or from the formation of ferrous sulphate monohydrate slurry, may contain sufficient acid to render the recycling of this material worthwhile.

The invention is illustrated by the following examples.

*Example 1*

A reactor was set up comprising a silica tube 3" in internal diameter and 5' in length. The silica tube had a side arm at one end. A porous sintered silica disc was sealed into the tube approximately 18" from the opposite end. The whole was surrounded by an electric furnace and was placed vertically, with the side arm at the top, in a brick structure approximately 1' thick.

In the silica tube were placed about 2,000 ml. of a mixture of Loch Aline sand and Quilon ilmenite having a particle diameter in the range 100 to 350 microns, to form a bed resting upon the sintered disc. The Loch Aline sand and Quilon ilmenite in the mixture were present in the ratio of 4:1 by volume and 2.5:1 by weight. Analysis of the Quilon ilmenite gave the figure $TiO_2$, 59.5%; Fe, 25.8% by weight.

Nitrogen was passed through the sintered disc at a rate of 13.5 litres per minute to fluidise the bed. The bed was heated by the electric furnace to a temperature of 670° C.

Sulphur was continuously vaporised by being preheated in an electric furnace. The vapour thus formed was passed at a rate of 14 gms. per minute down a tube placed within the bed to a point about ½" above the sintered disc. (A small amount of nitrogen was also passed through this tube to prevent blockage of the tube by any solidified sulphur.)

The nitrogen stream through the sintered disc was then replaced by oxygen at a flow rate of 4 litres per minute. The temperature in the bed rose to 700° C. It was apparent that the temperature of the bed could have been maintained at a constant value in the region of this temperature without electrical heating, by varying the rate of oxygen flow through the bed, but it was preferred to increase the oxygen flow rate to 7.5 litres per minute and to use a very small current in the electric furnace to provide a final control of the bed temperature.

After the process had been operated continuously for a considerable time under steady temperature conditions, the oxygen supply was cut off, the sulphur feed was stopped, and the bed was allowed to cool in the nitrogen stream.

After cooling, the bed volume was found to be about 1500 ml. From this, 700 gms. of sulphided ilmenite were recovered by magnetic separation. Analysis of the sulphided product showed it to contain $TiO_2$, 58.3%; Fe, 24.6%; and S, 14.2% by weight. (This implied 100% conversion of iron oxides to ferrous sulphide.)

The sulphided ilmenite produced was divided into several portions and these were treated as follows.

One portion was stirred at a temperature of 80° C. for two hours with one equivalent of waste acid from the hydrolysis of titanium sulphate (with the waste acid containing 19% $H_2SO_4$, 5.6% Fe and 0.3% $TiO_2$). A product was obtained containing 87.2% $TiO_2$ and only 4.3% Fe.

Another portion of the sulphided ilmenite was ground and treated with excess 20% $H_2SO_4$ and this gave a product containing 90% $TiO_2$.

A concentrate was taken after treatment of the sulphided ilmenite with waste sulphuric acid from the sulphate process; the concentrate contained 77% $TiO_2$. This concentrate material was used as bed material in a further sulphiding process similar to the one described above. This product, after treatment once more with the waste sulphuric acid from the sulphate process, gave a product containing 90% $TiO_2$.

*Example 2*

A reactor was used comprising a silica tube 2″ in internal diameter and 5′ in length. The tube had a side arm near to one end, the other end being tapered and sealed to form a truncated cone, the diameter being reduced at this end to about 1″. The whole was mounted vertically, the side arm at the top, and was surrounded by an electric furnace in an insulating brick structure approximately 1′ thick.

In the silica tube were placed about 322 mls. of a mixture of Loch Aline sand and Quilon ilmenite, having a particle diameter in the range of 100 to 350 microns, to form the bed. The ratio of Loch Aline sand to Quilon ilmenite in the mixture was 2:1 by volume or 1.26:1 by weight. Analysis of the Quilon ilmenite gave the figures $TiO_2$, 59.3%; Fe, 25.8%, by weight.

Centrally placed down the reactor tube were two concentric silica tubes to carry the fluidising gases, the sulphur and the bed feed (consisting of a Loch Aline sand/Quilon ilmenite mixture similar to that originally placed in the reactor tube). The outer tube, to carry the bed feed and part of the fluidising gas, had an internal diameter of about ¾″ and the inner tube to carry the rest of the fluidising gas and the sulphur, had an internal diameter of about 5/16″. The two tubes terminated at their lower ends within ¼″ to ½″ of the sealed tapered end.

Nitrogen was passed down both tubes at a rate of 13 litres per minute to fluidise the bed, and the bed temperature was raised to 750° C. by the electric furnace.

The addition of the bed feed was started, the sulphur feed was turned on and air was substituted for the nitrogen, being admitted at the same rate as the latter. The bed feed was added at a rate of 15 mls. per minute.

The sulphur addition was made by passing solid sulphur particles of about 500 microns diameter down the central tube in the fluidising gas stream. The temperature in the tube was sufficient to vaporise the sulphur before it entered the bed. The sulphur was added at a rate of 9 gms. per minute.

6 litres of the air flow of 13 litrees per minute were passed through the outer (bed feed) tube, and the remaining 7 litres were passed through the inner (sulphur feed) tube. The air passed through the sulphur feed tube prevented blocking of the tube by solid sulphur particles.

The bed temperature was carefully kept at 750° C. throughout the run.

The volume of the bed was increased by the addition of bed feed, and overflow of bed material commenced quite soon after the start of the reaction. This overflow material was collected in a reservoir at the end of the side arm down which bed material was carried by the effluent gases at a rate proportional to the bed feed rate.

The process was operated continuously for several hours under steady conditions.

The run was completed by replacing the air supply by nitrogen and immediately stopping the bed feed, the sulphur feed and the heat supply from the furnace. The bed was allowed to cool in the nitrogen stream before removal.

The sulphided ilmenite product was recovered from the overflow material by magnetic separation. Analysis of this product showed it to contain $TiO_2$, 58.4%; Fe, 21.4%; and S, 8.9%, by weight. The S figure of 8.9% is equivalent to 72.0% of the theoretical sulphiding figure.

A portion of the sulphided ilmenite was leached with a two fold excess of 20% sulphuric acid at 65° C. for two hours. An analysis of the leached product, after washing and drying, gave the following figures: $TiO_2$, 82%; Fe, 9.2%.

*Example 3*

The apparatus and method of Example 2 were used, except that leucoxene along was used instead of the mixture of ilmenite and Loch Aline sand, and the sulphur feed was introduced at a rate of 7.5, instead of 9, grams per minute.

The leucoxene contained 87.6% $TiO_2$ and 6.9% Fe, by weight. Its particle diameter was 100–350 microns. The original amount of leucoxene in the silica tube was 322 mls., and the additional leucoxene feed was introduced at a rate of 11.1 mls. per minute.

The sulphided leucoxene product was recovered from the overflow material by magnetic separation. Analysis of this product showed it to contain $TiO_2$, 87%, and S, 3.9%, by weight.

The S figure of 3.9% is equivalent to a 98% theoretical sulphiding efficiency.

A portion of the sulphided leucoxene was leached with a two-fold excess of 20% sulphuric acid at 65° C. for a period of two hours. An analysis of the leached product, after washing and drying, gave the following figure: $TiO_2$, 97%.

*Example 4*

A steel, brick lined reactor having an internal diameter of 15 ft. and a static bed height of 6 ft. is provided. The reactor has a brick base plate through which air is supplied to silicon carbide caps each having four ¼″ holes in the side of the caps. 180 of such caps can be used.

Air is supplied to the bed at a rate of 1300 cubic feet per minute, most of which is supplied through the base plate although a small proportion, e.g., about 15% is used to supply the reactants.

Such a furnace is capable of dealing with 44 tons of ilmenite and 166 tons of recycled concentrated ilmenite per day (the concentrated ilmenite is that which has been sulphided and treated with dilute acid to remove the iron sulphide). In addition to these amounts, 30 tons per day of sulphur is supplied to the reactor. All the reactants are blown into the bed beneath the surface by air which assists in the fluidisation of the bed. The bed temperature will be similar to that in the previous examples, i.e., 750° C.

The process is commenced by heating the bed with a gas poker and fluidising with air until the desired temperature is reached.

When the process is in operation the bed overflow is withdrawn and treated with 25% hydrolysis acid, after which the product is centrifuged, dried and a portion of the product is recycled to the fluid bed as a diluent as noted above. The remainder is carried forward as product.

The effluent gases from the reactor are passed through a cyclone separator, then to a waste heat boiler and to a condenser wherein sulphur vapour is condensed and pumped back to the reactor. The remainder of the effluent gases pass to a contact process plant for conversion to sulphuric acid.

The hydrogen sulphide from the leaching step may be used as a fuel (in addition to oil) to heat a fluidised bed in which ferrous sulphate can be decomposed (the ferrous sulphate being obtained by crystallisation from the leaching liquor). By the use of $H_2S$ as a fuel in the fluidised bed the sulphur dioxide content in the effluent gases from the bed is increased over that which would be obtained from the decomposition of ferrous sulphate alone and is thus strong enough to be converted directly into sulphuric acid.

What is claimed is:

1. A process for treating an iron-containing titaniferous material whereby the removal of iron from said material is facilitated, comprising fluidising said material and then sulphiding said material in the fluidised state at an elevated temperature in the presence of oxygen, whereby the iron is converted to an iron sulphide.

2. The process of claim 1 wherein the sulphiding is effected by reacting said material with elemental sulphur.

3. The process of claim 1 wherein said material is selected from the group consisting of ilmenite and leucoxene.

4. The process of claim 1 wherein said sulphiding of said material is conducted while said material is an admixture with a fluidised solid diluent.

5. A process for removing at least part of the iron in an iron-containing titaniferous material, comprising the steps of fluidising said material, sulphiding said fluidised material at an elevated temperature in the presence of oxygen so as to form iron sulphide, and removing said iron sulphide from said material by leaching said sulphided material with a dilute mineral acid to provide an undissolved titaniferous material concentrate and an iron-containing leach liquor.

6. The process of claim 5 wherein the sulphiding is effected by means of elemental sulphur.

7. The process of claim 5 wherein the leaching is carried out at a temperature of 60–85° C.

8. The process of claim 5 wherein the sulphiding is effected at a temperature of 600–900° C.

9. The process of claim 5 wherein said undissolved titaniferous material concentrate is recycled to be again fluidised, sulphided and leached whereby further iron is removed.

10. A process for removing at least some of the iron in an iron-containing titaniferous material, comprising the steps of fluidising said material, sulphiding said material while fluidised at 600–900° C. in the presence of oxygen so as to produce iron sulphide, and removing at least some of the iron sulphide by leaching the product with sulphuric acid of strength less than 75% sulphuric acid.

11. In a process for removing at least some of the iron in an iron-containing titaniferous material of particle size 50–1000 microns, the steps of fluidising said material in admixture with a solid diluent of particle size 50–1000 microns, reacting said fluidised material with sulphur in the presence of oxygen at 600–900° C. to form a mixture of iron sulphide and titaniferous material, and leaching said mixture with sulphuric acid of strength less than 30% sulphuric acid so as to remove at least part of said iron sulphide from said mixture.

12. The process of claim 11 wherein the leaching is carried out at 60–85° C.

13. A process for treating an iron-containing titaniferous material to facilitate the removal of iron therefrom, comprising fluidising said material and then selectively reacting at least some of the iron in said material in the fluidised state at an elevated temperature with a sulphiding agent in the presence of oxygen to form an iron sulphide-containing material.

14. A process for removing at least part of the iron in an iron-containing titaniferous material, comprising the steps of fluidising said material, selectively reacting at least some of the iron in the fluidised material at an elevated temperature with a sulphiding agent in the presence of oxygen to form an iron sulphide-containing material and then removing the iron sulphide by leaching said sulphided material with a dilute mineral acid.

15. A process for removing at least some of the iron in an iron-containing titaniferous material comprising the steps of fluidising said material, selectively reacting at least some of the iron in said material while fluidised at 600–900° C. with a sulphiding agent in the presence of oxygen to produce an iron sulphide-containing material, and then removing at least some of the iron sulphide by leaching the sulphided product with sulphuric acid of strength less than 75% sulphuric acid.

16. A process for removing at least some of the iron in an iron-containing titaniferous material of particle size 50–1000 microns comprising the steps of fluidising said material in admixture with a solid diluent of particle size 50–1000 microns, selectively reacting at least some of the iron in said fluidised material with sulphur in the presence of oxygen at 600–900° C. to form a mixture containing iron sulphide and titanium dioxide, and leaching said mixture with sulphuric acid of strength less than 30% sulphuric acid so as to remove at least part of said iron sulphide.

References Cited in the file of this patent

UNITED STATES PATENTS

| | | |
|---|---|---|
| 1,171,542 | Rossi | Feb. 15, 1916 |
| 1,819,770 | D'Ans | Aug. 18, 1931 |
| 2,290,112 | Merriam et al. | July 14, 1942 |
| 2,670,573 | Sullivan | Mar. 2, 1954 |
| 2,857,265 | Schossberger | Oct. 21, 1958 |
| 2,953,434 | McKinney et al. | Sept. 20, 1960 |

OTHER REFERENCES

Queneau: Extractive Metallurgy of Copper, Nickel and Cobalt, 1961, Interscience Publishers, New York, pages 3–32.